United States Patent
Takemoto

(10) Patent No.: US 8,943,022 B2
(45) Date of Patent: Jan. 27, 2015

(54) DISTRIBUTED FILE SYSTEM

(75) Inventor: Taira Takemoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/430,575

(22) Filed: Mar. 26, 2012

(65) Prior Publication Data

US 2012/0254110 A1 Oct. 4, 2012

(30) Foreign Application Priority Data

Mar. 29, 2011 (JP) ................................. 2011-072790

(51) Int. Cl.
 *G06F 17/30* (2006.01)

(52) U.S. Cl.
 CPC .............................. *G06F 17/30212* (2013.01)
 USPC ........................................................ 707/624

(58) Field of Classification Search
 CPC ................................................ G06F 17/30575
 USPC ......................................................... 707/624
 See application file for complete search history.

(56) References Cited

U.S. PATENT DOCUMENTS

| | | | |
|---|---|---|---|
| 5,729,743 A | 3/1998 | Squibb | |
| 7,765,197 B2 | 7/2010 | Fujiyama et al. | |
| 8,255,651 B2* | 8/2012 | Liu et al. ........................ | 711/162 |
| 2004/0111390 A1 | 6/2004 | Saito et al. | |
| 2007/0179929 A1 | 8/2007 | Fujiyama et al. | |
| 2010/0131468 A1* | 5/2010 | Thakore ........................ | 707/624 |
| 2010/0179941 A1* | 7/2010 | Agrawal et al. ................ | 707/624 |
| 2011/0196830 A1* | 8/2011 | Zunger et al. ................. | 707/624 |
| 2011/0218968 A1* | 9/2011 | Liu et al. ........................ | 707/649 |
| 2011/0289052 A1* | 11/2011 | Rambacher et al. ........... | 707/624 |
| 2013/0066830 A1* | 3/2013 | Lacapra et al. ................ | 707/624 |

FOREIGN PATENT DOCUMENTS

| | | |
|---|---|---|
| JP | 2002-542526 A | 12/2002 |
| JP | 2007-179342 A | 7/2007 |
| JP | 2007-200086 A | 8/2007 |
| JP | 2008-040762 A | 2/2008 |
| JP | 2010-015301 A | 1/2010 |

OTHER PUBLICATIONS

Extended European Search Report date Jul. 1, 2014.
Japanese Office Action dated Aug. 26, 2014 with English Translation.

* cited by examiner

*Primary Examiner* — Robert Beausoliel, Jr.
*Assistant Examiner* — Alexandria Bromell
(74) *Attorney, Agent, or Firm* — McGinn IP Law Group, PLLC

(57) ABSTRACT

A computer node connected with an upstream computer node and a downstream computer node so as to be capable of communicating therewith has a replication file system of a master file system, a storing unit, and a controlling unit. The controlling unit receives incremental data showing a changed part of the master file system from the upstream computer node, stores the incremental data into the storing unit, reflects the incremental data on the file system, and transfers the incremental data to the downstream computer node. Moreover, in a case that incremental data for plural times having received from the upstream computer node and having not transferred to the downstream computer node yet are accumulated in the storing unit, the controlling unit merges, with last received incremental data among the incremental data for plural times, the rest of the incremental data for plural times.

18 Claims, 16 Drawing Sheets

FIG. 14

NODE LIST

| NODE 1 | NODE NAME | STATUS |
|---|---|---|
| NODE 2 | NODE NAME | STATUS |
| NODE 3 | NODE NAME | STATUS |
| ⋮ | ⋮ | ⋮ |
| NODE n | NODE NAME | STATUS |
| NEXT HOP | NODE NAME | STATUS |

DISTRIBUTED FILE SYSTEM

INCORPORATION BY REFERENCE

This application is based upon and claims the benefit of priority from Japanese patent application No. 2011-072790, filed on Mar. 29, 2011, the disclosure of which is incorporated herein in its entirety by reference.

TECHNICAL FIELD

The present invention relates to a distributed file system, more specifically, relates to a distributed file system that multiplexes a file system by transferring incremental data of the file system among computer nodes connected by a network.

BACKGROUND ART

Highly reliable distributed file systems employ multiplexing, which is to create a replication file system having the same content as a master file system and store the replication file system into a computer node other than a computer node storing the master file system. These distributed file systems update the master file system and reflect the updated content on the replication file system to maintain file system multiplexing. Even if either the master file system or the replication file system crashes, these distributed file systems can restore the content of the file system from the other file system. Moreover, by creating a plurality of replication file systems, it is possible to secure higher reliability.

An example of a method for creating a replica of master data into a plurality of computer nodes is shown in FIG. 10 of Patent Document 1. In the technique described in Patent Document 1, the computer nodes having the replication data are connected in a row. When the data on the master computer node is updated, the replication data on one computer node at the head of the computer nodes having the replication data is also updated. Next, the updated data is transferred from the head computer node to a second computer node, and the replication data on the second computer node is updated. The same operation is repeatedly performed in order up to the last computer node. Such multiplexing in which data necessary for updating replication data is relayed from a computer node to a computer node is called relay multiplexing. Moreover, the side of the master computer side is called an upstream side, and the side of the last computer node is a downstream side.

[Patent Document 1] Japanese Unexamined Patent Application Publication No. JP-A 2007-200086

The relay multiplexing described above makes it possible to prevent concentration of load on a specific computer node. However, when a delay occurs in communication between the computer nodes, a large amount of data that cannot be sent out to the downstream side remains in a storage part of the computer node on the upstream side from a place in which the delay occurs.

SUMMARY

An object of the present invention is to provide a distributed file system that solves the abovementioned problem: in the relay multiplexing, it is difficult to reduce data remaining on the intermediate computer node unless the data is sent out to the downstream side.

A distributed file system according to an exemplary embodiment of the present invention includes a first computer node having a first file system, a second computer node connected to the first computer node so as to be capable of communicating therewith and having a second file system as a replica of the first file system, and a third computer node connected to the second computer node so as to be capable of communicating therewith and having a third file system as a replica of the first file system and, in the distributed file system:

the first computer node has an incremental data generating unit configured to generate a portion changed from a previous incremental data generation moment among data of the first file system as incremental data, a first storing unit, and a first controlling unit configured to store the incremental data generated by the incremental data generating unit into the first storing unit and transmit to the second computer node;

the second computer node has a second storing unit, and a second controlling unit configured to store the incremental data received from the first computer node into the second storing unit, reflect on the second file system, and transmit to the third computer node;

the third computer node has a third storing unit, and a third controlling unit configured to store the incremental data received from the second computer node into the third storing unit and reflect on the third file system; and in a case that the incremental data for plural times having received from the first computer node and having not transmitted to the third computer node yet are accumulated in the second storing unit, the second controlling unit merges the remaining incremental data other than the incremental data having been received last among the incremental data for plural times with the incremental data having been received last among the incremental data for plural times.

Further, a multiplexing method in a distributed file system according to another exemplary embodiment of the present invention is a multiplexing method executed by a distributed file system which includes a first computer node having a first file system, a second computer node connected to the first computer node so as to be capable of communicating therewith and having a second file system as a replica of the first file system, and a third computer node connected to the second computer node so as to be capable of communicating therewith and having a third file system as a replica of the first file system, and in which the first computer node has an incremental data generating unit, a first storing unit and a first controlling unit, the second computer node has a second storing unit and a second controlling unit, and the third computer node has a third storing unit and a third controlling unit, and the multiplexing method in the distributed file system includes:

generating a portion changed from a previous incremental data generation moment among data of the first file system as incremental data, by the incremental data generating unit of the first computer node;

storing the incremental data generated by the incremental data generating unit into the first storing unit and transmitting to the second computer node, by the first controlling unit of the first computer node;

storing the incremental data received from the first computer node into the second storing unit, reflecting on the second file system, and transmitting to the third computer node, by the second controlling unit of the second computer node;

storing the incremental data received from the second computer node into the third storing unit and reflecting on the third file system, by the third controlling unit of the third computer node; and in a case that the incremental data for plural times having received from the first computer node and having not transmitted to the third computer node yet are accumulated in the second storing unit, merging the remaining incremental data other than the incremental data having been received last among the incremental data for plural times with the incremental data having been received last among the incremental data for plural times, by the second controlling unit of the second computer node.

Since the present invention has the abovementioned configurations, it is possible to reduce data remaining on the intermediate computer node without sending out the data to the downstream side.

BRIEF DESCRIPTION OF DRAWINGS

FIG. 14 is an explanation view of a node list in the second exemplary embodiment of the present invention;

EXEMPLARY EMBODIMENT

Next, exemplary embodiments of the present invention will be described in detail with reference to the drawings.

First Exemplary Embodiment

Figure 1:
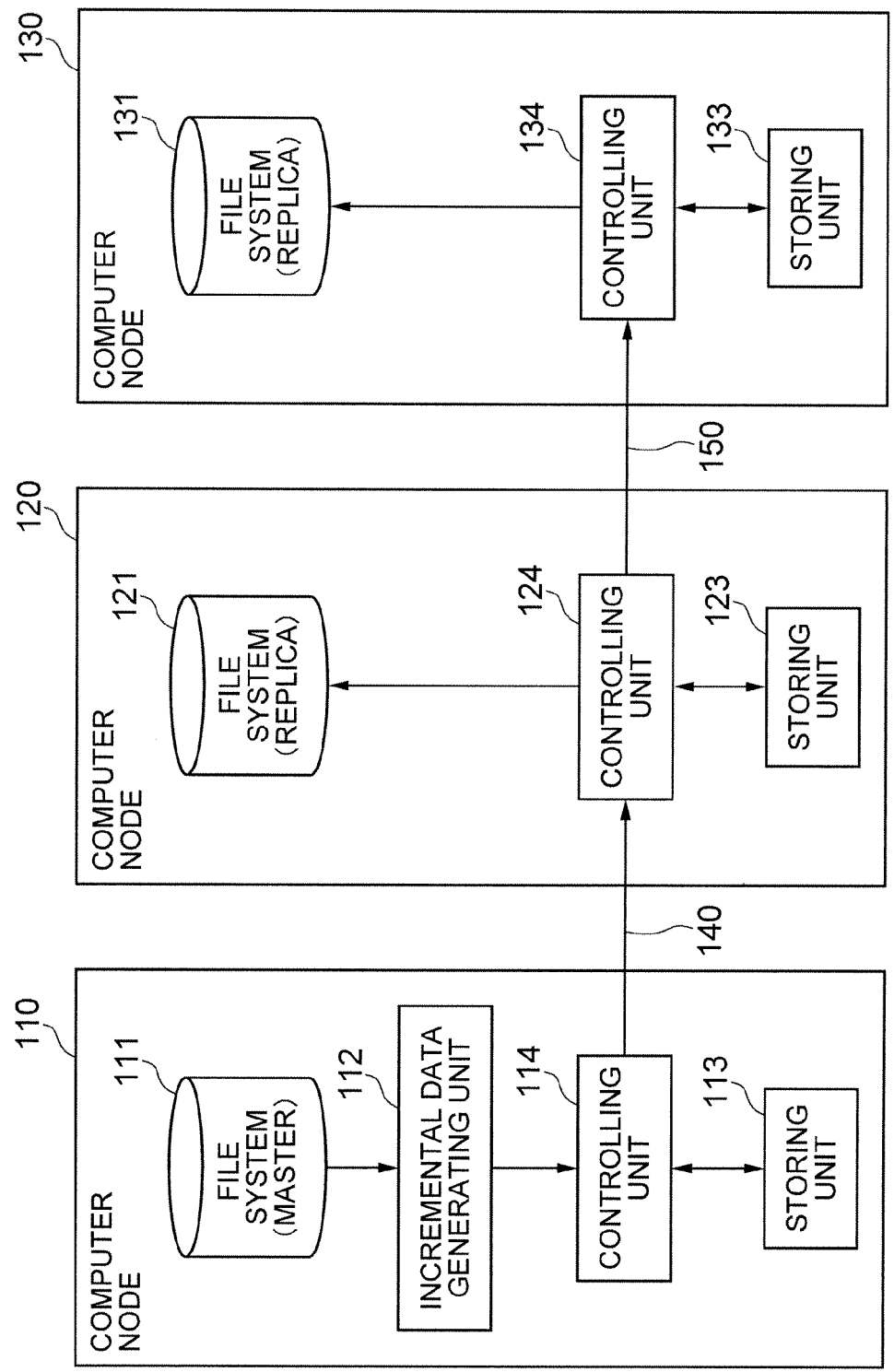
FIG. 1 is a block diagram of a first exemplary embodiment of the present invention.

With reference to FIG. 1, a distributed file system according to a first exemplary embodiment of the present invention has a computer node 110, a computer node 120 connected with the computer node 110 so as to be capable of communicating therewith via a network 140, and a computer node 130 connected with the computer node 120 so as to be capable of communicating therewith via a network 150.

The computer node 110 has a master file system 111, an incremental data generating unit 112 for, every time data is added or changed or at regular periods, generating data having been changed from or added to previous data among data of the file system 111 as incremental data, a storing unit 113, and a controlling unit 114 configured to store the incremental data generated by the incremental data generating unit 112 into the storing unit 113 and transmit the incremental data to the computer node 120.

The incremental data generating unit 112 may acquire a snapshot that is an image of the file system 111 every time data is changed or added or at regular periods and calculate a difference between a currently acquired snapshot and a previously acquired snapshot as incremental data. Moreover, the incremental data may have only a block changed from or added to previous data among blocks configuring the file system.

Figure 2:
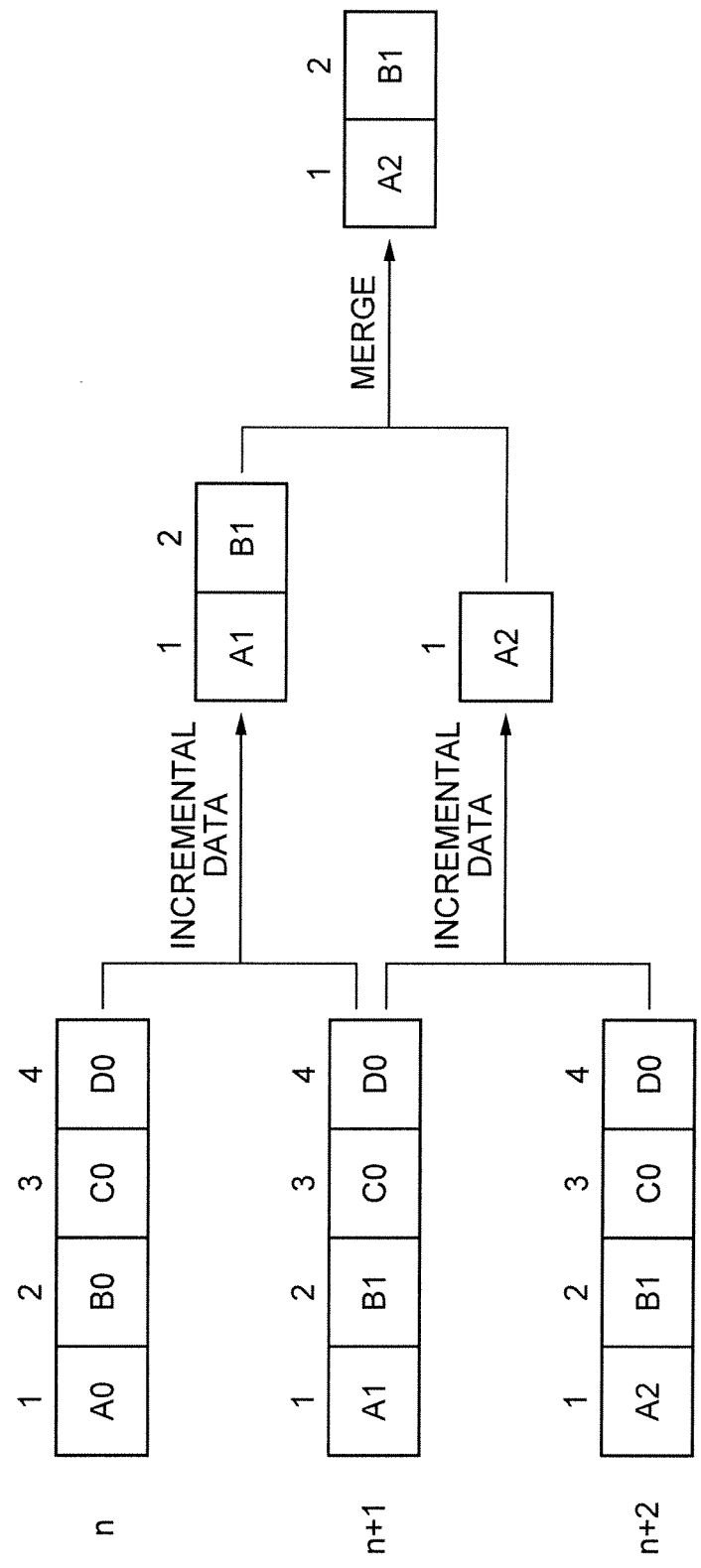
FIG. 2 is a diagram for explaining incremental data and a merge process thereof in the first exemplary embodiment of the present invention.

For example, it is assumed that the file system 111 is configured by four blocks in total and the contents of snapshots acquired $n^{th}$ time, $(n+1)^{th}$ time and $(n+2)^{th}$ time are as shown in FIG. 2. In FIG. 2, A0 to D0, A1, A2 and B1 show the contents of the respective blocks. That is to say, the contents of blocks 1 to 4 are A0 to D0, respectively, in the snapshot acquired $n^{th}$ time, the contents of the blocks 1 and 2 are changed from A0 and B0 to A1 and B1 in the snapshot acquired $(n+1)^{th}$ time, and the content of the block 1 is further changed to A2 in the snapshot acquired $(n+2)^{th}$ time. At this moment, incremental data between n and n+1 has the block 1 having the content of A1 and the block 2 having the content of B1. Moreover, incremental data between n+1 and n+2 has the block 1 having the content of A2.

The computer node 120 has a file system 121 that is a replica of the file system 111, a storing unit, and a controlling unit 124 that stores incremental data received from the computer node 110 into the storing unit 123, reflects the incremental data on the file system 121 and transmits the incremental data to the computer node 130. Moreover, the controlling unit 124 has a function of, when detecting while transmitting incremental data to the computer node that incremental data for plural times after the incremental data being transmitted are accumulated in the storing unit 123, merging the incremental data for plural times into one incremental data. In other words, the controlling unit 124 has a function of, in a case that incremental data for plural times having been received from the computer node 110 but having not been transmitted to the computer node 130 yet are accumulated in the storing unit 123, merging, with last received incremental data among the incremental data for plural times, the rest of the incremental data for plural times and deleting the rest of the incremental data from the storing unit 124.

When merging first incremental data and second incremental data received next to the first incremental data, the controlling unit 124 generates incremental data including a block included in either the first incremental data or the second incremental data and, in a case that a block is included in each of the first incremental data and the second incremental data, the block of the second incremental data. For example, incremental data obtained by merging incremental data between n and n+1 with incremental data between n+1 and n+2 shown in FIG. 2 has a block 1 having a content A2 and a block 2 having a content B1. In other words, the controlling unit 124 merges, with last received incremental data among incremental data for plural times, the rest of the incremental data, and deletes the rest of the incremental data from the storing unit 123. In this merging process, incremental data including a block included in any one of incremental data for plural times and, in a case that a block is included in each of two or more incremental data, the block of the last received incremental data is generated.

Further, the controlling unit 124 transmits a request for deleting the incremental data deleted from the storing unit 123 to the controlling unit 114 of the upstream computer mode 110. Upon reception of the deletion request, the controlling unit 114 deletes the incremental data relating to the deletion request from the storing unit 113.

The computer node 130 has a file system 131 that is a replica of the file system 111, a storing unit 133, and a controlling unit 134 that stores incremental data received from the computer node 120 and reflects the incremental data on the file system 131.

Next, an operation of this exemplary embodiment will be described.

Every time data is changed or added in the file system 111 or at regular periods, the incremental data generating unit 112 of the computer node 110 generates data changed from or added to previous data among the data of the file system 111, as incremental data. The controlling unit 114 stores the incremental data generated by the incremental data generating unit 112 into the storing unit 113, and transmits the incremental data to the computer node 120.

Upon reception of the incremental data from the computer node 110, the controlling unit 124 of the computer node 120 stores the received incremental data into the storing unit 123 and also reflects the incremental data on the file system 121. Moreover, the controlling unit 124 transmits the received incremental data to the computer node 130.

Upon reception of the incremental data from the computer node 120, the controlling unit 134 of the computer node 130 stores the received incremental data into the storing unit 133 and also reflects the incremental data on the file system 131.

Incremental data of the file system 111 is reflected on the file systems 121 and 131 as described above, and the file systems 121 and 131 thereby keep the same contents as the file system 111.

Incremental data stores in the storing unit 113, 123 and 133 of the computer nodes 110, 120 and 130 may be deleted at a moment that the need for storing the data is eliminated. For example, because no computer node exists downstream from the computer node 130, the computer node 130 may delete incremental data from the storing unit 133 at a moment that reflection of the data on the file system 131 of the node 130 is finished. On the other hand, the computer node 120 cannot delete incremental data only by finishing reflection of the data on the file system 121 of the node 120. This is because in a case that incremental data having been transmitted to the downstream computer node 130 is not normally received by the computer node 130, there is the need for retransmitting. Therefore, the computer node 120 deletes incremental data having been reflected on the file system 121 of the node 120 and having been transmitted normally to the downstream computer node 130, from the storing unit 123. Moreover, the computer node 110 deletes the incremental data having been normally transmitted to the downstream computer node 120 from the storing unit 113.

For example, in a case that it takes long time for communication of incremental data because of congestion of a communication network connecting the computer node 120 and the computer node 130, such a state occurs that, while the computer node 120 is transmitting the incremental data to the computer node 130, new incremental data is transmitted from the computer node 110 to the computer node 120 and accumulated into the storing unit 123. When detecting that incremental data for plural times after the incremental data being transmitted are stored in the storing unit 123, the controlling unit 124 merges the incremental data for plural times into one incremental data. That is to say, the controlling unit 124 merges, with the last received incremental data among incremental data for plural times, the rest of the incremental data, and deletes the rest of the incremental data from the storing unit 123. Moreover, the controlling unit 124 transmits a request for deleting the deleted incremental data to the controlling unit 114 of the upstream computer node 110.

After that, when transmission of the incremental data being transmitted is finished, the controlling unit 124 retrieves the incremental data after merged from the storing unit 123 and transmits the data to the computer node 130.

Upon reception of the incremental data after merged from the computer node 120, the controlling unit 134 of the computer node 130 stores the received incremental data after merged into the storing unit 133 and also reflects the data on the file system 131.

Thus, according to this exemplary embodiment, it is possible to reduce incremental data remaining on an intermediate computer node without sending out the incremental data to the downstream side. For example, in the example shown in FIG. 2, by merging the incremental data between n and n+1 and incremental data between n+1 and n+2, it is possible to reduce the amount of the remaining data to two thirds.

Further, according to this exemplary embodiment, since the number and amount of incremental data sent out to the downstream side are reduced by merging, it is possible to send the incremental data up to a terminal computer node in a shorter time. Consequently, it is possible to early maintain multiplexing of a file system.

Second Exemplary Embodiment

Characteristic of this Exemplary Embodiment

A characteristic of this exemplary embodiment is a method of effectively relaying a snapshot of a file system and keeping the file system multiplexed among nodes connected by a network.

Problems to be Solved by this Exemplary Embodiment

There is a technique of, in order to multiplex a file system, transmitting an incremental snapshot (simply referred to as a snapshot hereinafter) that is an increment between an image of the file system at one moment and an image of the file system at a next moment and synchronizing data among nodes. However, in a case that an intermediate node receives snapshots one after another from a parent node while transmitting a snapshot, the number of snapshots to be transmitted increases and the cost (the capacity of a disk, the number of snapshots, the number of times of communication) also increases. This is not efficient, and there is a need to decrease the number of snapshots to be stored and manage it with efficiency.

Means for Solving by this Exemplary Embodiment

In this exemplary embodiment, the number of snapshots to be managed is reduced and an efficient snapshot relay is realized. Moreover, when a node withdraws from and recovers to a network, the respective nodes dynamically determines a parent-child relation of the nodes and synchronize. Therefore, there is no limitation of the number of nodes that relay a snapshot, and favorable scalability can be realized. Functions of the nodes are divided into three major types: a head node function; an intermediate node function; and a terminal node function. The respective nodes are defined by a model in which only a parent node and a child node communicate. The node function unit is provided for each file system.

Configuration of this Exemplary Embodiment

Figure 3:
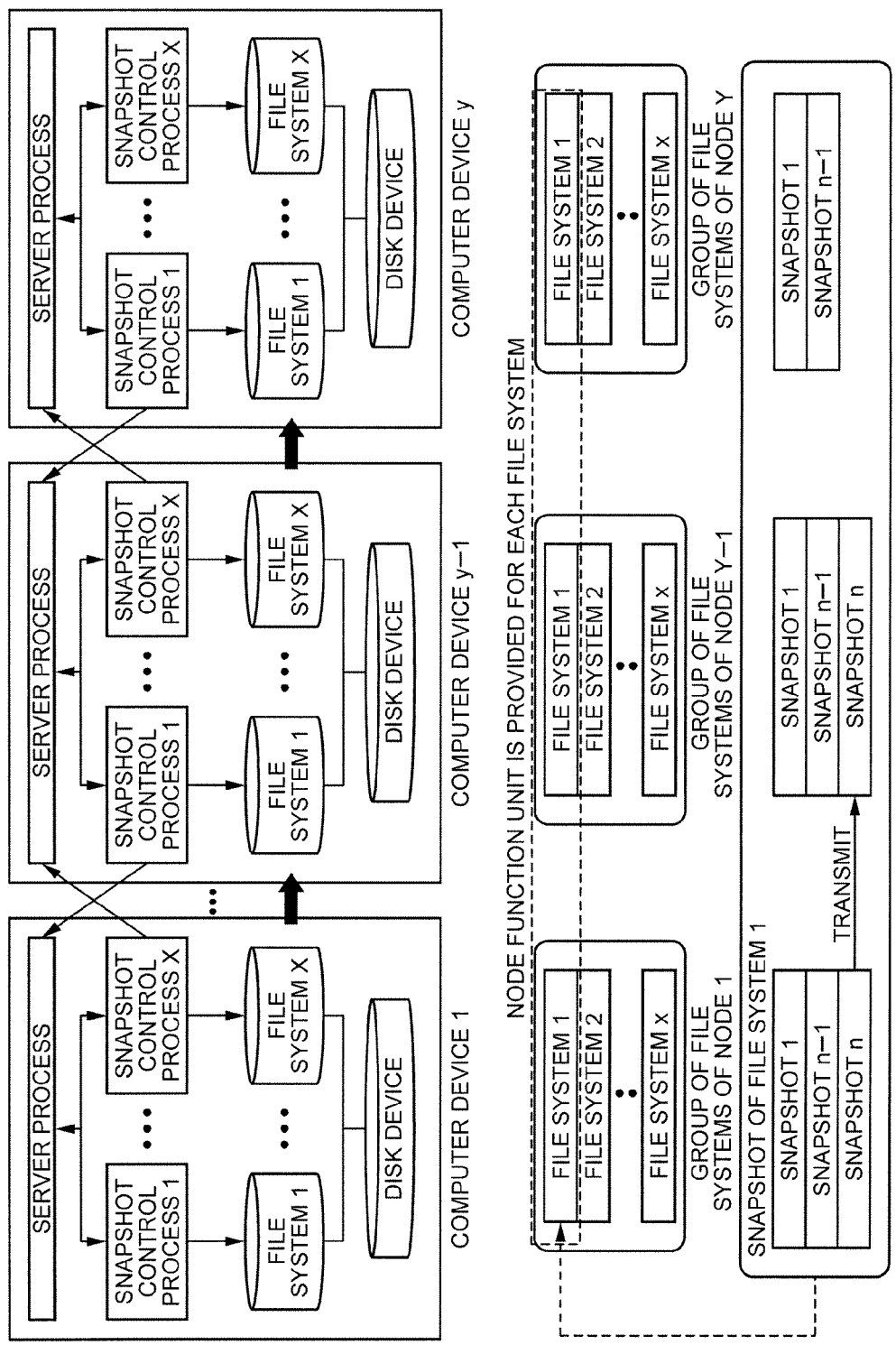
FIG. 3 is a configuration explanation diagram of a second exemplary embodiment of the present invention.

A configuration of this exemplary embodiment will be described. The overall configuration is shown in FIG. 3. The system is configured by a plurality of computer devices. Each of the computer devices has one server process that executes control of a snapshot control process. Moreover, each of the computer devices has one or more disk devices. The disk device stores one or more file systems. On each of the file systems, a plurality of snapshots can be configured. There is one snapshot control process for each of the file systems.

The number of the computer devices, namely, the number of the nodes can be one to y. In the case of one computer device, the computer device does not execute a transfer process. In the case of two computer devices, the computer devices are configured by a head node and a terminal node. In the case of three or more computer devices, the computer devices are configured by a head node, one or more intermediate nodes, and a terminal node.

Figure 4:
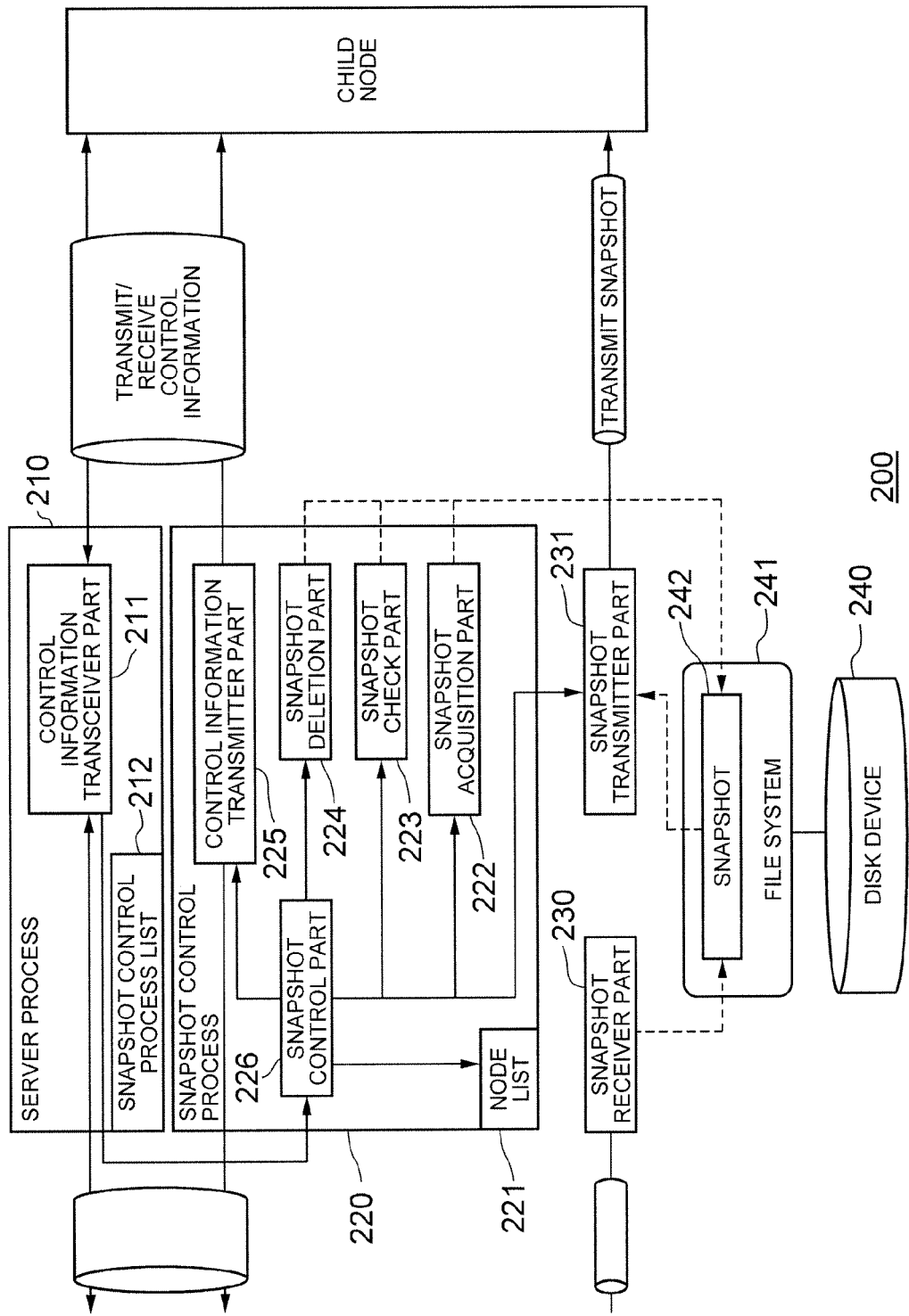
FIG. 4 is a block diagram of a node in the second exemplary embodiment of the present invention.
Figure 5:
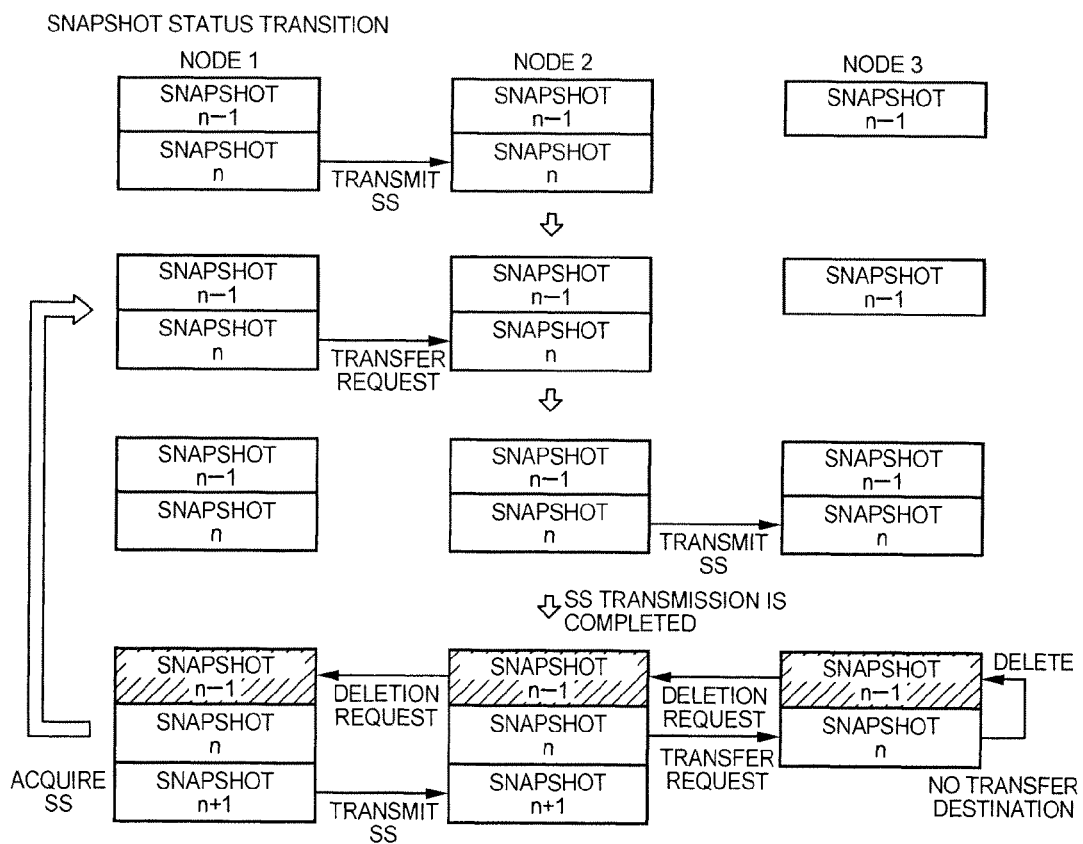
FIG. 5 is a diagram showing transition of the status of a snapshot in the second exemplary embodiment of the present invention.
Figure 6:
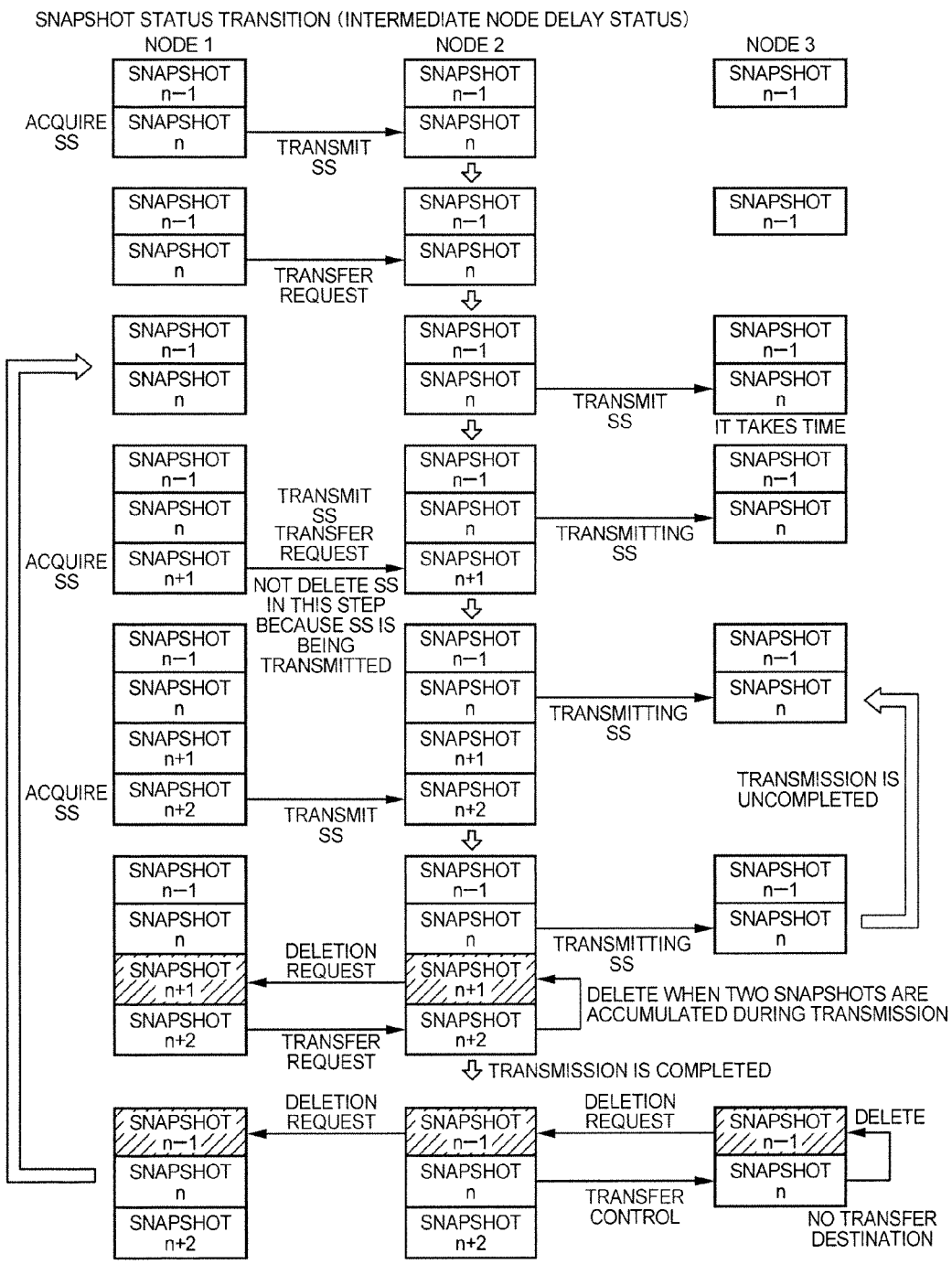
FIG. 6 is a diagram showing transition of the status of a snapshot in an intermediate node delay status in the second exemplary embodiment of the present invention.

A configuration example of the inside of the node is shown in FIG. 4. With reference to FIG. 4, a node 200 has a server process 210, a snapshot control process 220, a snapshot receiver part 230, a snapshot transmitter part 231, a file system 241, and a disk device 240.

The server process 210 has a control information transceiver part 211 that transmits and receives control information, and a snapshot control process list 212 that manages snapshot control process information.

The snapshot control process 220 has a node list 221 that manages node information, a snapshot acquisition part 222 that acquires a snapshot, a snapshot check part 223 that checks a snapshot, a snapshot deletion part 224 that deletes a snapshot, a control information transmitter part 225 that transmits transfer control information, and a snapshot control part 226 that manages the respective parts.

The snapshot receiver part 230 that receives a snapshot and the snapshot transmitter part 231 that transmits a snapshot may be a function of the snapshot control process 220, or may be an external function of the file system 241 or the like.

The disk device 240 has one or more file systems 241, and a plurality of snapshots 242 can be configured on each of the file systems.

Explanation of Operation of this Exemplary Embodiment

<Operation Sequence>
1. Server Process

At the time of start of the system, the server process 210 starts the same number of the snapshot control processes 220 as the number of the file systems to be managed. In a case that the number of the file systems to be managed is x, the server process 210 starts x-number of snapshot control processes 220. The server process 210 stores a list of the snapshot control processes 220 to be managed into the snapshot control process list 212.

In a case that the snapshot control process 220 stops involuntarily, the server process 210 restarts the process. At the time of stop of the system, the server process 210 refers to the snapshot control process list 212, and stops the x-number of snapshot control processes having been started.

2. Snapshot Control Process
2.1. Snapshot Transmission Sequence of Head Node

Next, with reference to FIGS. 4, 5, 9 and 10, an operation sequence of a head node will be described. Each process of the snapshot control process 220 is controlled by the snapshot control part 226 (referred to as the control part 226 hereinafter).

The control part 226 sends a snapshot acquisition request to the snapshot acquisition part 222 at regular intervals or when data written into the file system. The snapshot acquisition part 222 executes acquisition of a snapshot from the file system 241.

After acquisition of a snapshot is executed, a currently transmitted snapshot (n) is stored in the file system 241, and a snapshot having been transmitted previously is stored as a previously transmitted snapshot (n−1). The control part 226 sends a request for transmitting the currently transmitted snapshot (n) to a child node, to the snapshot transmitter part 231. Upon reception of the transmission request, the snapshot transmitter part 231 transmits the snapshot to the child node.

Upon completion of transmission of the snapshot (n), the control part 226 transmits a request for transferring the current snapshot (n) to the child node, via the control information transmitter part 225. After that, the control information transceiver part 211 of the server process 210 receives a transfer request result that is a response to the transfer request from the child node, and sends the result to the control part 226 of the snapshot control process 220. In a case that the transfer request result shows success, the operation proceeds to a next snapshot acquisition transfer cycle. In a case that the transfer request result shows failure, the previously transmitted snapshot (n−1) and the currently transmitted snapshot (n) are stored.

2.2 Snapshot Transfer Sequence of Intermediate Node

Next, with reference to FIGS. 4, 5, 9 and 11, an operation sequence of an intermediate node will be described.

Upon reception of the snapshot (n), the snapshot receiver part 230 applies the snapshot to the file system 241. Consequently, the file system 241 of the intermediate node synchronizes with the file system 241 of the parent node.

Next, the control information transceiver part 211 of the server process 210 receives a request for transferring the snapshot (n) and sends to the control part 226. Upon reception of the transfer request, the control part 226 sends a request for checking the snapshot (n) to the snapshot check part 223. The snapshot check part 223 checks whether the snapshot (n) is stored in the file system 241. In a case that the snapshot (n) is stored, the control part 226 sends a request for transmitting the snapshot (n) to the snapshot transmitter part 231. This transmission request is executed asynchronously and, after the transmission request is sent, the control part 226 returns the process without waiting for completion of transmission. The control part 226 transmits a transfer request result that is a response to the abovementioned transfer request, via the control information transceiver part 211 of the server process 210.

When transmission of the snapshot (n) is completed, the control part 226 transmits a request for transferring the currently transmitted snapshot (n) to the child node via the control information transmitter part 225. After that, the server process 210 receives a result of the snapshot (n) transfer request from the child node, and sends the result to the control part 226 of the snapshot control process 220. In a case that the transfer request result shows success, the control part 226 sends a request for deleting the previously transmitted snapshot (n−1) to the parent node via the control information transmitter part 225. In a case that the transfer request result shows failure, the previously transmitted snapshot (n−1) and the currently transmitted snapshot (n) are stored.

Next, with reference to FIGS. 4, 6, 9 and 11, a sequence when an intermediate node receives a snapshot (n+1) and a snapshot (n+2) while transmitting the snapshot (n) will be described.

Upon reception of a request for transferring the snapshot (n+1), the control information transceiver part 211 of the server process 210 sends it to the control part 226. Upon reception of this transfer request, the control part 226 sends a request for checking the snapshot (n+1) to the snapshot check part 223. At this moment, even when the snapshot (n+1) exists, the control part 226 suspends transmission of the snapshot (n+1) to the child node because the snapshot (n) is being transmitted. After that, the control part 226 transmits a result of the snapshot (n+1) transfer request showing success to the parent node via the control information transceiver part 211 of the server process 210.

Subsequently, upon reception of a request for transferring the snapshot (n+2), the control information transceiver part 211 of the server process 210 sends it to the control part 226. Upon reception of this transfer request, the control part 226 sends a request for checking the snapshot (n+2) to the snapshot check part 223. At this moment, even when the snapshot (n+2) exists, the control part 226 suspends transmission of the snapshot (n+2) to the child node as well as the snapshot (n+1) because the snapshot (n) is being transmitted. Instead, because snapshots for plural times, namely, the previously received snapshot (n+1) and the currently received snapshot (n+2) are stored without being transmitted, the control part 226 sends a request for merging the previously received snapshot (n+1) with the currently received snapshot (n+2) to the snapshot deletion part 224. The snapshot deletion part 224 replaces the currently received snapshot (n+2) with data obtained by merging the previously received snapshot (n+1) and the currently received snapshot (n+2), and executes deletion of the previously received snapshot (n+1). In addition, a request for deleting the previously received snapshot (n+1) is sent to the parent node via the control information transmitter part 225. After that, the control part 226 transmits a result of the snapshot (n+2) transfer request showing success to the parent node via the control information transceiver part 211 of the server process 210.

2.3 Snapshot Reception Sequence of Terminal Node

Next, with reference to FIGS. 4, 5, 9 and 12, an operation sequence of a terminal node will be described.

When receiving the snapshot (n), the snapshot receiver part 230 applies the snapshot to the file system 241. Consequently, the file system 241 of the terminal node synchronizes with the file system 241 of the parent node.

Next, the control information transceiver part 211 of the server process 210 receives a request for transferring the snapshot (n), and sends it to the control part 226. Upon reception of this transfer request, the control part 226 sends a request for checking the snapshot (n) to the snapshot check part 223. The snapshot check part 223 checks whether the snapshot (n) is stored in the file system 241. At this moment, a transfer process is not executed because a child node as a transfer destination does not exist. In a case that the snapshot (n) is stored, the control part 226 sends a request for deleting a previously received snapshot (n−1) to the snapshot deletion part 224. The snapshot deletion part 224 executes deletion of the snapshot (n−1). Next, the control part 226 sends the request for deleting the previously received snapshot (n−1) to the parent node via the control information transmitter part 225. After completion of the process, the control part 226 transmits a transfer request result to the parent node via the control information transceiver part 211 of the server process 210.

2.4 Common Sequence

Asynchronously with the acquisition transfer cycle, the control information transceiver part 211 of the server process 210 receives the request for deleting the previously transmitted snapshot (n−1) from the child node. In the case of receiving the request, the control information transceiver part 211 sends the deletion request to the control part 226 of the snapshot control process 220, and the control part 226 sends the snapshot deletion request to the snapshot deletion part 224. The snapshot deletion part executes deletion of the snapshot. Deletion of the snapshot is not deletion of actual data of the file system but deletion of a snapshot as management information.

Asynchronously with the acquisition transfer cycle, the control information transceiver part 211 of the server process 210 receives a node status change request. In the case of receiving the request, the control information transceiver part 211 sends the node status change request to the control part 226 of the snapshot control process 220, and the control part 226 changes the node status in the node list 221.

3. Sequence at Node Withdrawal

Figure 7:
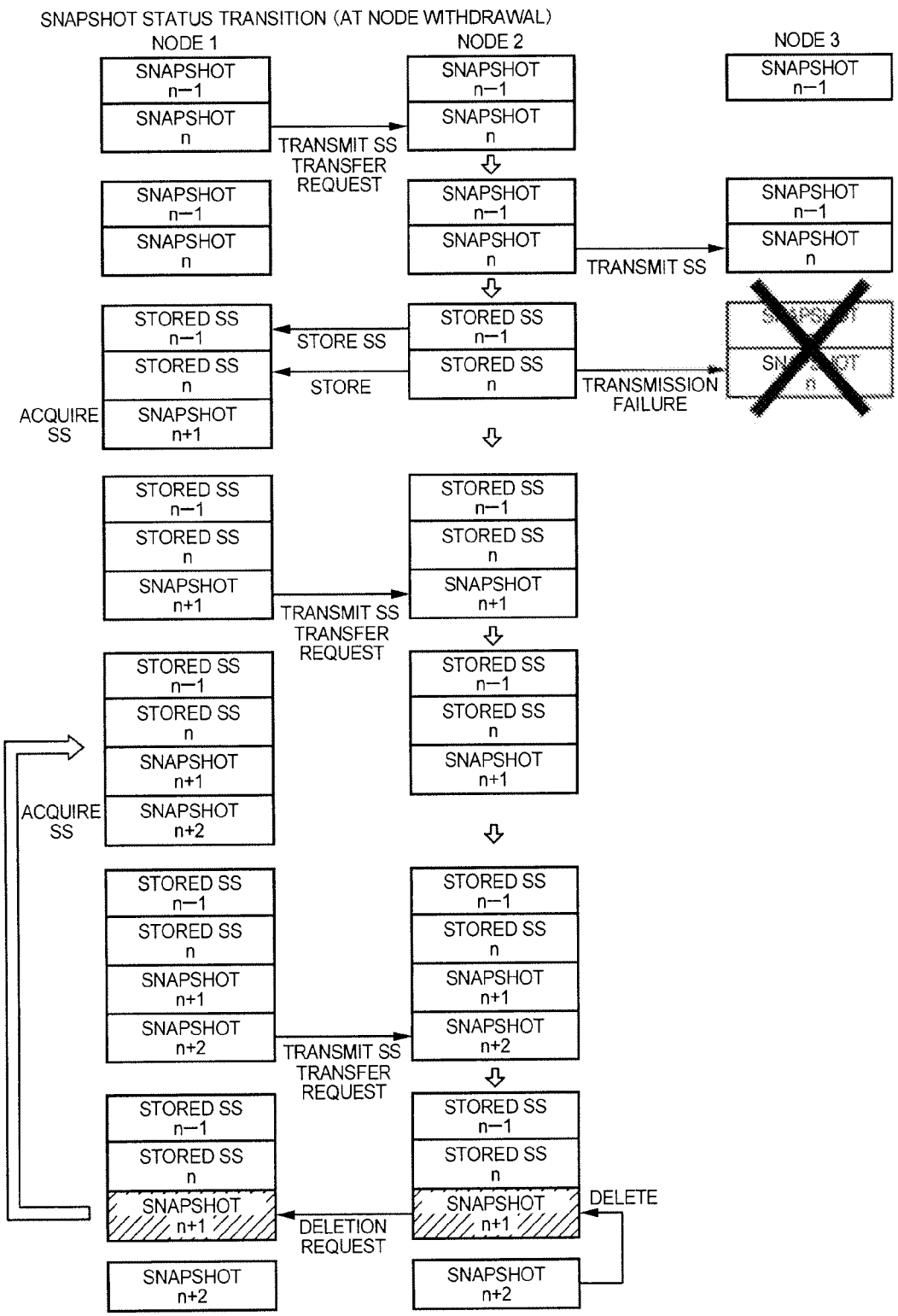
FIG. 7 is a diagram showing transition of the status of a snapshot at withdrawal of the node in the second exemplary embodiment of the present invention.

With reference to FIG. 7, a sequence at node withdrawal will be described. An example of FIG. 7 shows a sequence in a case that a child node 3 withdraws from a group of nodes during transfer from an intermediate node 2 to the node 3. In a case that the node 3 withdraws from the group of nodes (e.g., node down) during transmission of a snapshot, the currently transmitted snapshot (n) and the previously transmitted snapshot (n−1) are stored so as not to be deleted, and the status of the node 3 in the node list is set to an abnormal state. Moreover, a request for storing the snapshots and changing the status of the node 3 is transmitted to a parent node 1.

Thus, both the previously transmitted snapshot (n−1) and the currently transmitted snapshot (n) are stored. These two snapshots are stored because it is unknown whether transmission of the snapshots to the node 3 has been completed at withdrawal of the node 3. A latest snapshot that the node 3 has when the node 3 having withdrawn recovers to the group of nodes is one of the two snapshots stored by the node 2 and the node 1, and it is possible to resynchronize based on the snapshot.

Figure 8:
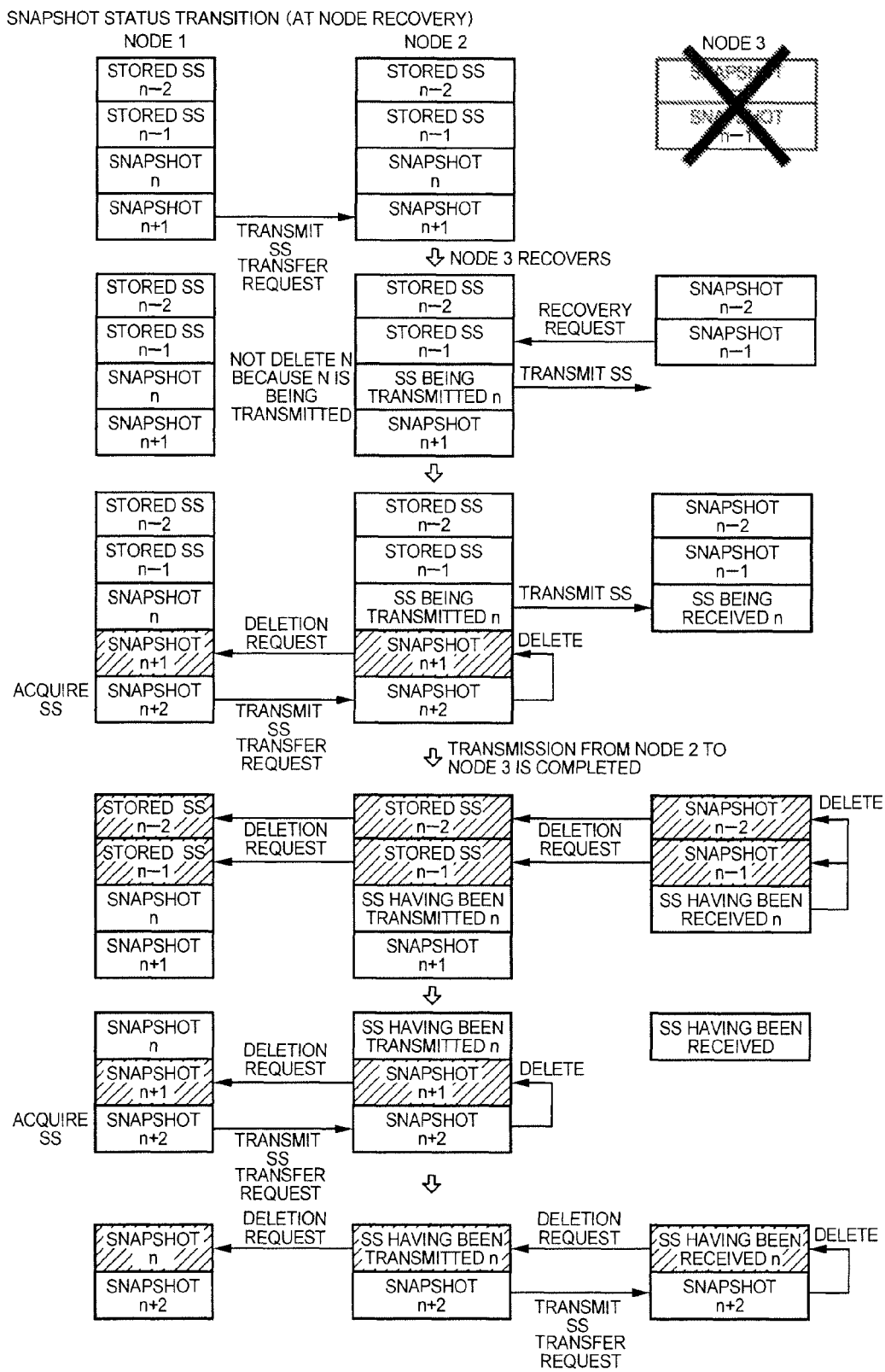
FIG. 8 is a diagram showing transition of the status of a snapshot at recovery of the node in the second exemplary embodiment of the present invention.
Figure 9:
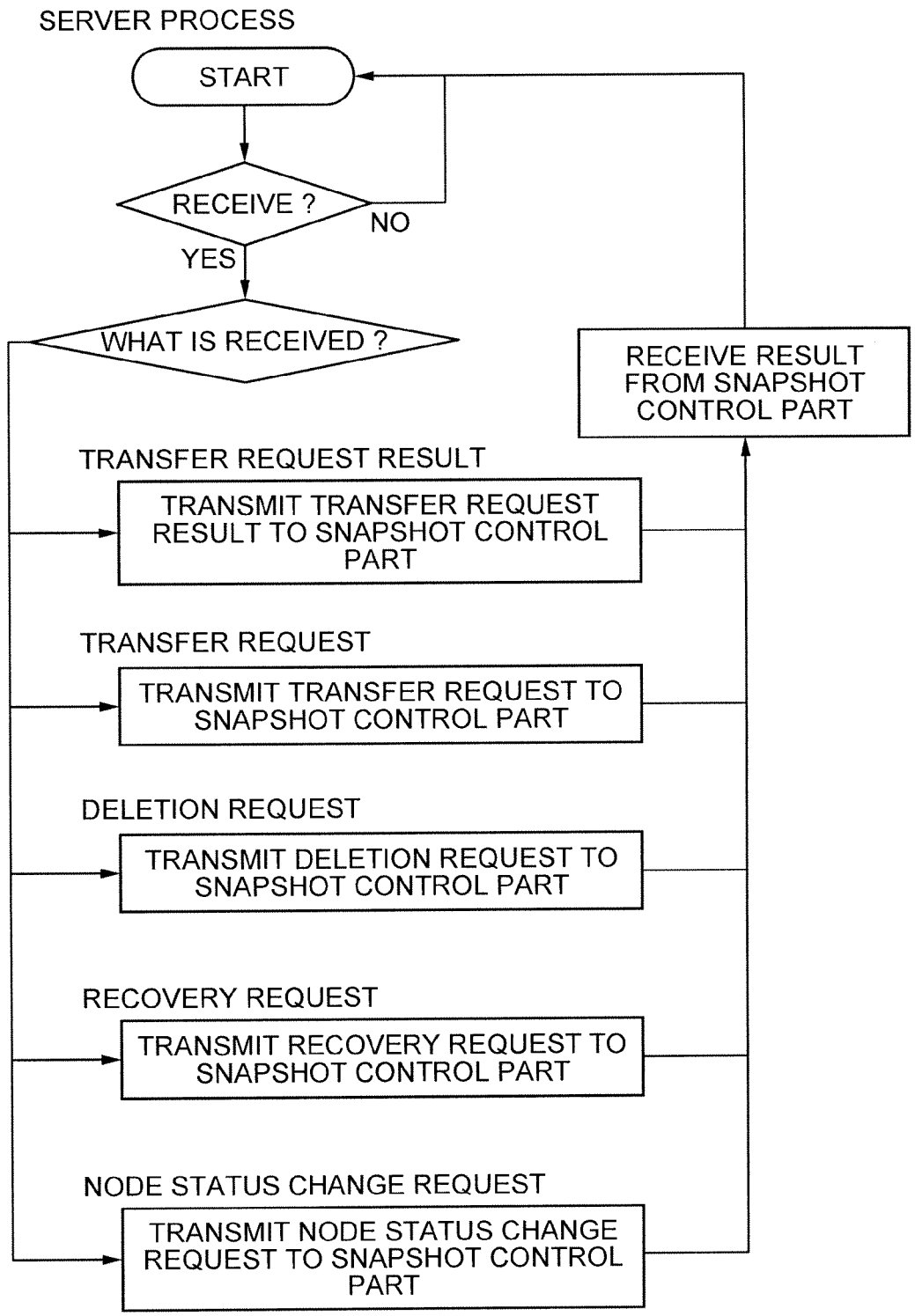
FIG. 9 is a flowchart showing a processing example of a server process in the second exemplary embodiment of the present invention.
Figure 10:
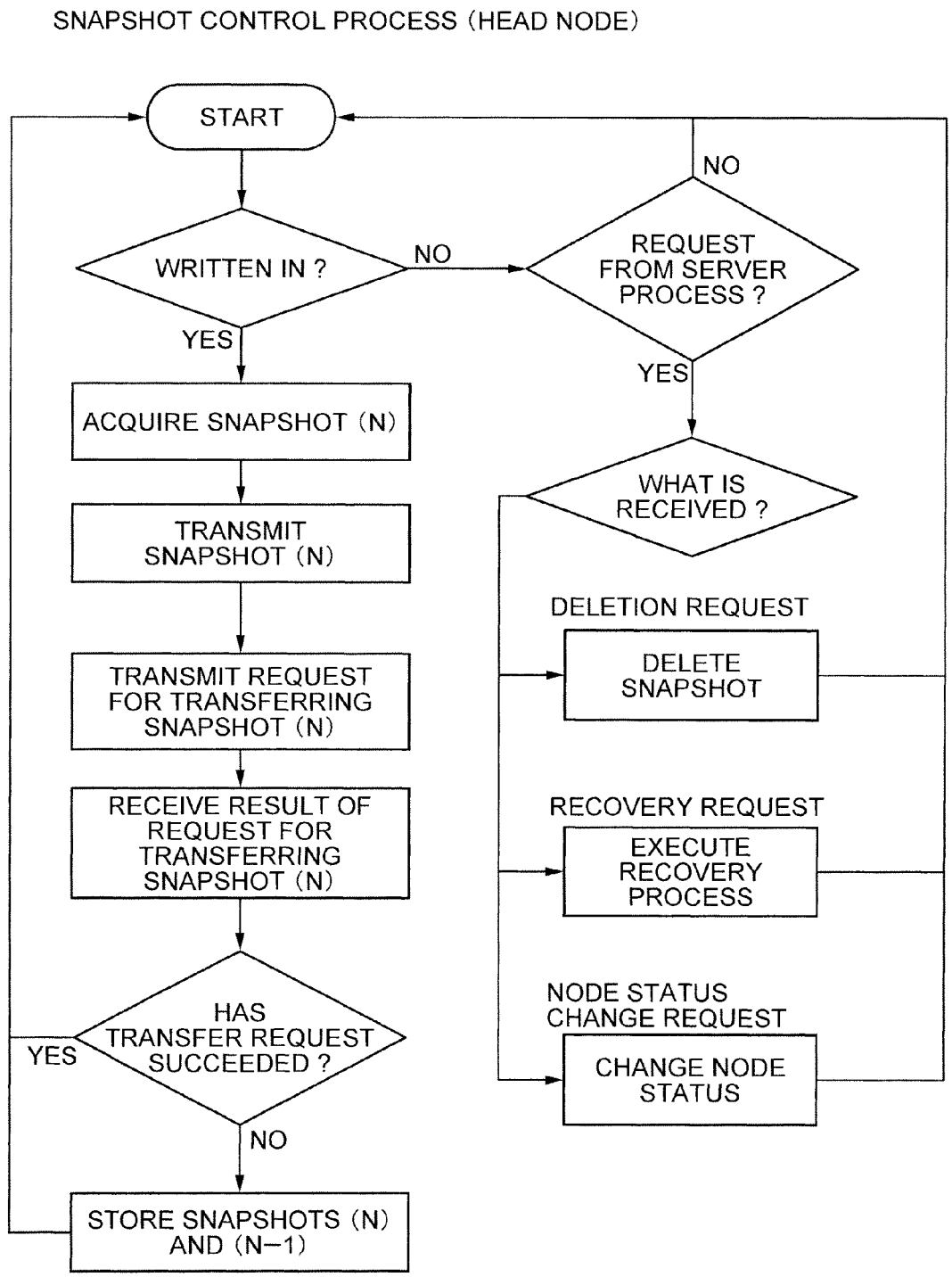
FIG. 10 is a flowchart showing a processing example of a snapshot control process by a head node in the second exemplary embodiment of the present invention.
Figure 11:
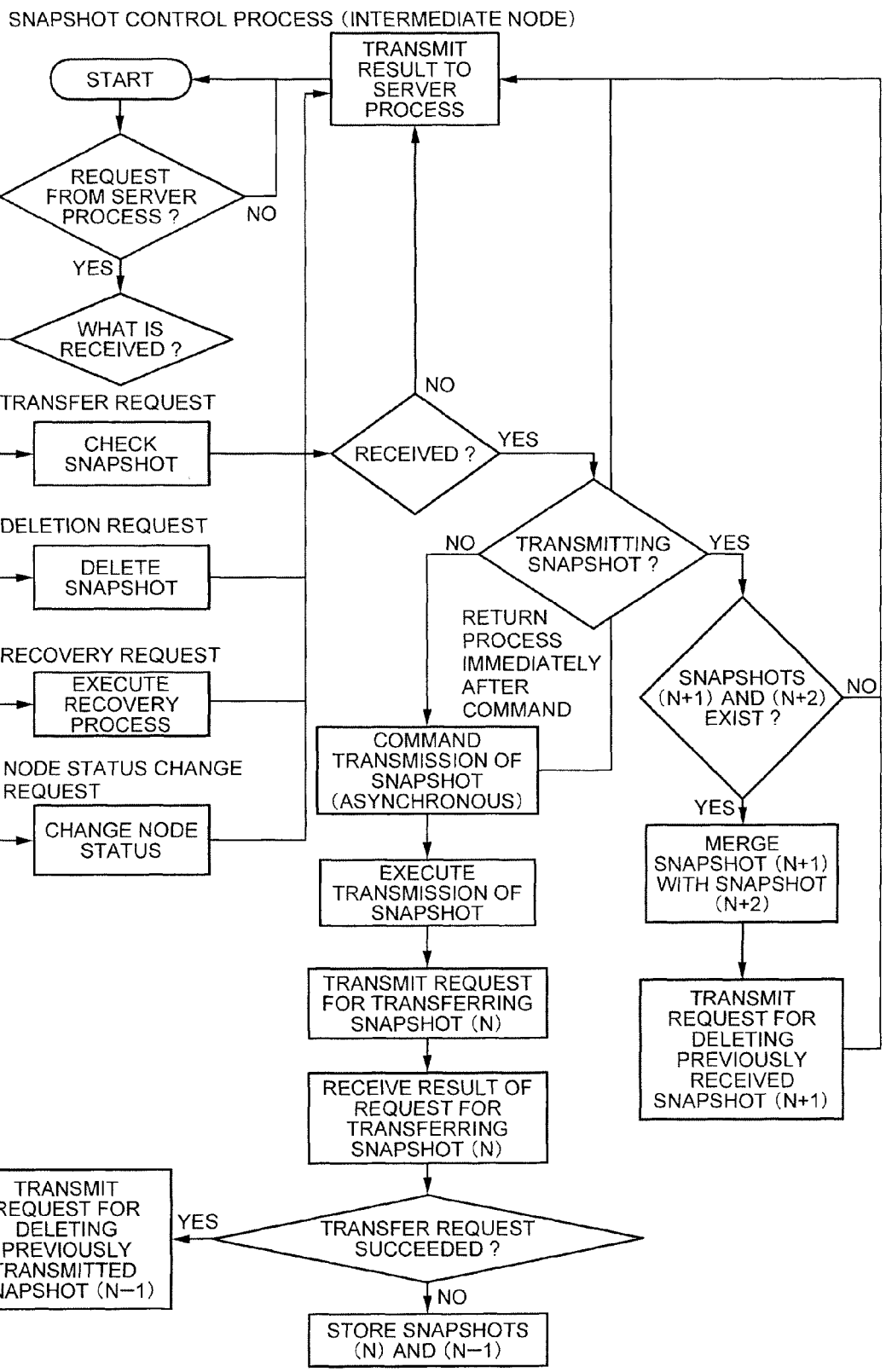
FIG. 11 is a flowchart showing a processing example of a snapshot control process by an intermediate node in the second exemplary embodiment of the present invention.
Figure 12:
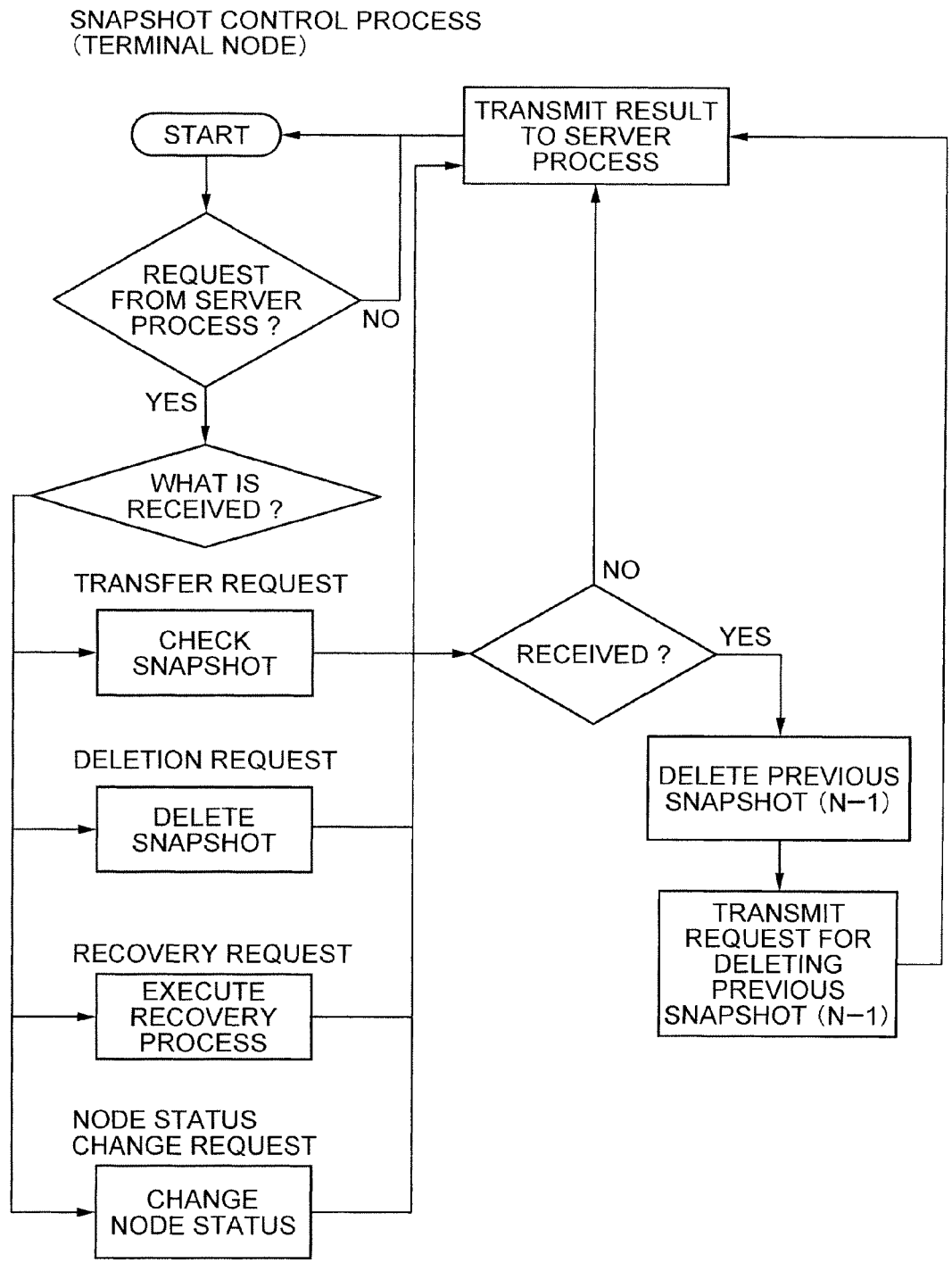
FIG. 12 is a flowchart showing a processing example of a snapshot control process by a terminal node in the second exemplary embodiment of the present invention.

After the snapshots are stored, the cycle process is continued. The node 2 executes transfer of the snapshot in a case that a next priority child node exists. In the example of FIG. 7, the node 2 operates as a terminal node function of the group of nodes because the node 2 does not have a child node 4. Sequence at Node Recovery Next, with reference to FIG. 8, a sequence of node recovery will be described. An example of FIG. 8 shows a sequence in a case that the node 3 transmits a recovery request to the node 2. The node 3 transmits the recovery request to the node 2 based on the snapshot (n−1) as a latest snapshot that the node 3 has. Upon reception of the recovery request, the node 2 executes difference synchronization from the stored snapshot (n−1) to the previously received snapshot (n).

Asynchronously with the difference synchronization, a snapshot is transmitted from the node 1 to the node 2, and the cycle process is executed. At this moment, the previously received snapshot (n) is not deleted while the difference synchronization is executed.

After the difference synchronization between the node 2 and the node 3 is completed, the node 2 becomes an intermediate node, and the node 3 is added to the group of nodes as a terminal node. Moreover, the snapshot (n−1) and the snapshot (n−2) of the node 3 are deleted, and a request for deleting the stored snapshot (n−1) and the stored snapshot (n−2) and a status change request to the parent node 2.

Upon reception of the request for deleting the stored snapshots and the status change request, the node 2 deletes the snapshots and changes the status of the node 3 to normal. Upon completion of the process, the node 2 transmits the request for deleting the snapshots and the status change request to the parent node 1.

Upon reception of the request for deleting the snapshots and the status change request, the node 1 deletes the snapshots and changes the status of the node 3 to normal. At this moment, asynchronously with the deletion process, the cycle process between the node 1 and the node 2 is continued.

After completion of the difference synchronization, in the case of receiving a request for transferring the snapshot (n+2), the node 2 checks whether the snapshot is stored in the file system. In a case that the snapshot is stored, the node 2 deletes the previously received snapshot (n+1) and transmits a request for deleting the previously received snapshot (n+1) to the parent node 1. After the process is completed, the node 2 transmits the snapshot (n+2) to the node 3. This transmission is executed asynchronously, and a transfer request process result is returned to the parent node 1.

Upon completion of transmission of the snapshot (n+2) being transmitted, the node 2 transmits a request for transferring the snapshot (n+2) to the node 3. It is checked that the node 3 stores the snapshot, and the previously received snapshot (n) is deleted. In addition to a transfer request result to the node 2, the node 3 transmits a request for deleting the previously received snapshot (n) to the node 2. Upon reception of the transfer request result, the node 2 transmits a request for deleting the previously transmitted snapshot (n) to the parent node 1. As a result of execution of the processes described above, all of the nodes return to a normal state in which all of the nodes synchronize.

<Supplement>
1. Transfer Request Packet

Figure 13:
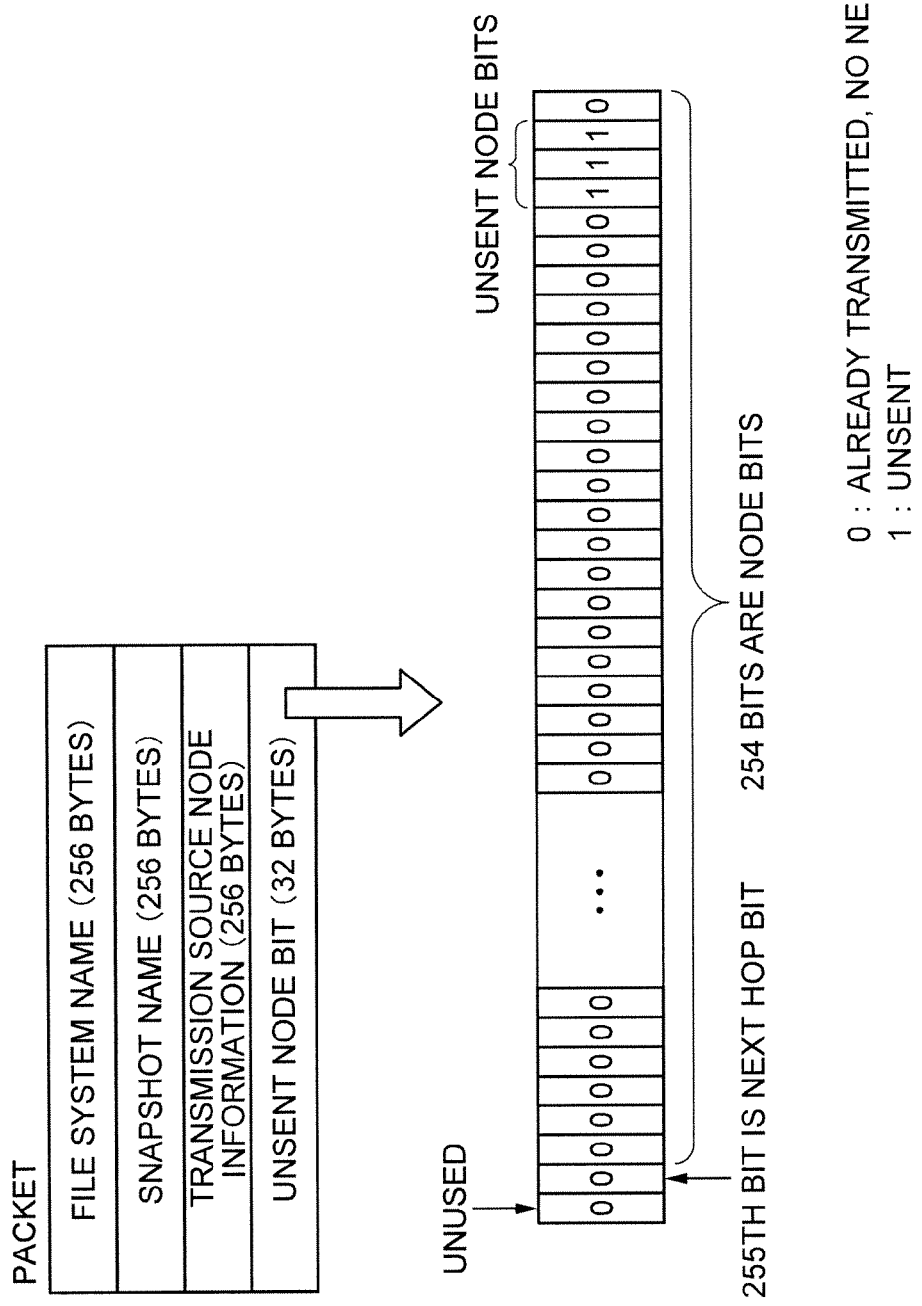
FIG. 13 is an explanation view of a transfer request packet in the second exemplary embodiment of the present invention.

With reference to FIG. 13, a transfer request packet will be described. A transfer request packet includes:
a) a file system name unique on a computer device, ID showing it, or the like;
b) the name of a snapshot to be transferred, ID showing it, or the like;
c) what shows a transmission source node, such as the name of a transmission source node or an IP address; and
d) an unsent node bit that prevents transmission of a transfer request to a node having already received.

In an unsent node bit, bits are arranged in the order of nodes. When transmitting a transfer request, a head node sets the bit of a transmission target node to 1. An intermediate node sets the bit thereof to 0 at the time of transfer, and transmits a transfer request to a child node.

2. Node List

With reference to FIG. 14, the node list will be described. Each node holds a node list registered to a group of nodes. Each node does not manage the statuses of all of the nodes, but manages only the statuses of a parent node and a child node thereof. In a case that each node cannot transmit data to the child node, the node determines the child node has withdrawn from the group of nodes and sets the status of the child node to abnormal. In a case that communication from the parent node abnormally ends, each node sets the status of the parent node to abnormal. Moreover, in response to a status change request from the node having withdrawn from the group of nodes, each node sets the status of the node having withdrawn to normal.

3. Next Hop

Figure 15:
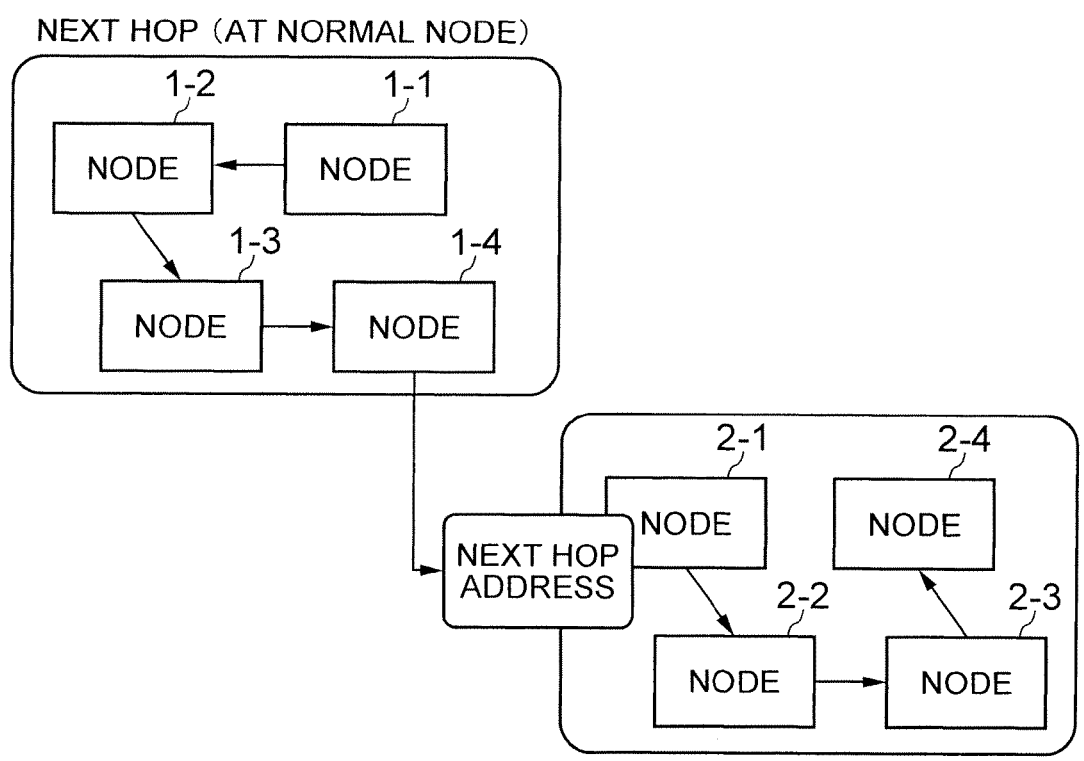
FIG. 15 is an explanation view of a next hop in the second exemplary embodiment of the present invention.

With reference to FIG. 15, a next hop will be described. The size of an unsent node bit included in a transfer request packet determines the number of nodes to which data can be transferred. In a case that a next-hop address is set, a terminal node among a group of nodes operates as an intermediate node function, and transfers a snapshot to the next-hop address. In general, a next-hop address designates a virtual IP address of a next group of nodes. A next-hop address may designate a physical IP address. A node having the next-hop address of the next group of nodes operates as an intermediate node function.

In FIG. 15, a snapshot of a head node 1-1 is sequentially transferred up to a node 1-4, and the node 1-4 operates as an intermediate node function to transfer the snapshot to a next-hop address. A node 2-1 having the next-hop address operates as an intermediate node function, and sequentially transfers the snapshot up to a node 2-4. The node 2-4 operates as a terminal node.

Figure 16:
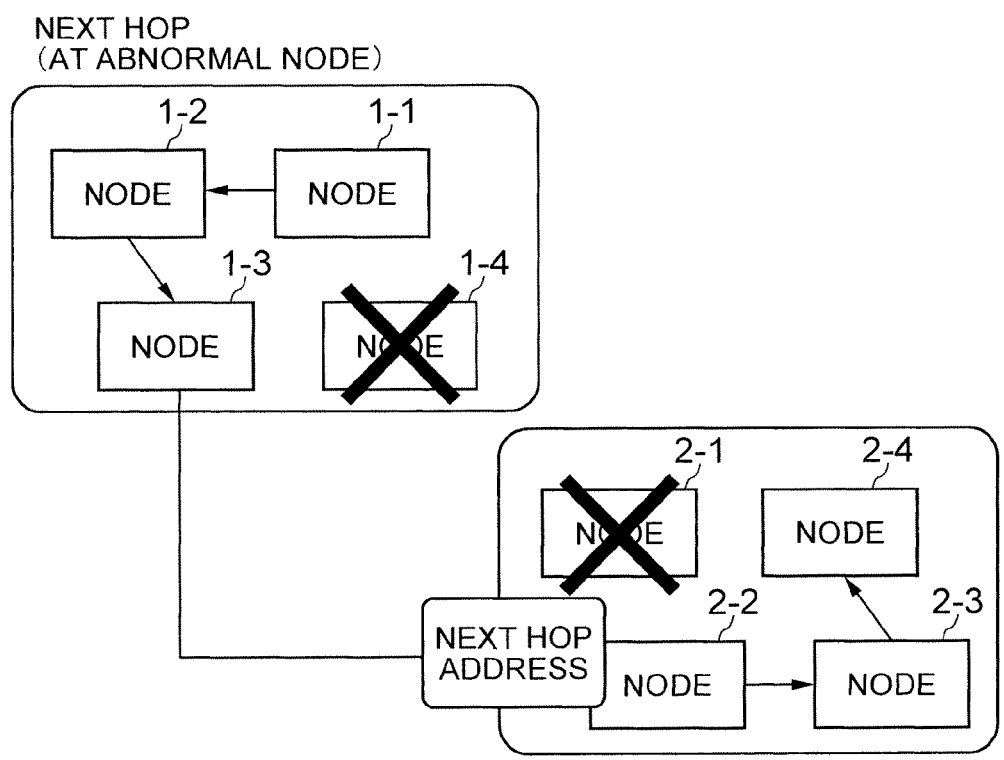
FIG. 16 is an explanation view of a next hop in the second exemplary embodiment of the present invention.

Next, with reference to FIG. 16, a case of occurrence of a node malfunction will be described. FIG. 16 shows an example of a case in which a terminal node of a group of nodes has withdrawn and a head node of a next group of nodes has withdrawn. Because the node 1-4 has withdrawn, a node 1-3 serving as a parent node of the node 1-4 executes a process of transferring to the next hop in place of the node 1-4. Because the node 2-1 has withdrawn, a node 2-2 serving as a child node of the node 2-1 holds the next-hop address and executes the process in place of the node 2-1, Effect of this Exemplary Embodiment 1. It is possible to perform data synchronization among a plurality of nodes and, in a case that failure of one or more nodes occurs, it is possible to use data by another node.
2. It is possible to utilize the present invention in every file system having a snapshot function.

Other Exemplary Embodiments

1. The present invention relates to various file systems having a snapshot function.
2. Other than a snapshot of a file system, all data having a difference storing function can be transferred.
3. Encrypted data can be transmitted.
4. Compressed data can be transmitted.
5. By using HA cluster software for application switching after occurrence of failure, an operation suspension time can be limited as short as possible.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Moreover, a controlling unit of a computer node configuring a distributed file system of the present invention can be realized by a computer and a program. The program is provided by being recoded on a computer-readable recording medium such as a magnetic disk and a semiconductor memory, and read by the computer when the computer is started. The program controls the operation of the computer, whereby the controlling unit of the first exemplary embodiment, or the like, is realized on the computer.

SUPPLEMENTARY NOTES

The whole or part of the exemplary embodiments disclosed above can be described as, but not limited to, the following supplementary notes.

Supplementary Note 1

A distributed file system, comprising a first computer node having a first file system, a second computer node connected to the first computer node so as to be capable of communicating therewith and having a second file system as a replica of the first file system, and a third computer node connected to the second computer node so as to be capable of communicating therewith and having a third file system as a replica of the first file system, wherein:

the first computer node has an incremental data generating unit configured to generate a portion changed from a previous incremental data generation moment among data of the first file system as incremental data, a first storing unit, and a first controlling unit configured to store the incremental data generated by the incremental data generating unit into the first storing unit and transmit to the second computer node;

the second computer node has a second storing unit, and a second controlling unit configured to store the incremental data received from the first computer node into the second storing unit, reflect on the second file system, and transmit to the third computer node;

the third computer node has a third storing unit, and a third controlling unit configured to store the incremental data received from the second computer node into the third storing unit and reflect on the third file system; and in a case that the incremental data for plural times having received from the first computer node and having not transmitted to the third computer node yet are accumulated in the second storing unit, the second controlling unit merges the remaining incremental data other than the incremental data having been received last among the incremental data for plural times with the incremental data having been received last among the incremental data for plural times.

Supplementary Note 2

The distributed file system according to Supplementary Note 1, wherein the second controlling unit deletes the remaining incremental data after the merging from the second storing unit.

Supplementary Note 3

The distributed file system according to Supplementary Note 1 or 2, wherein:

the second controlling unit transmits a request for deleting the incremental data deleted from the second storing unit to the first controlling unit; and the first controlling unit deletes the incremental data relating to the deletion request from the first storing unit.

Supplementary Note 4

The distributed file system according to any of Supplementary Notes 1 to 3, wherein the incremental data generating unit generates a set of blocks changed from a previous incremental data generation moment among blocks configuring the first file system, as the incremental data.

Supplementary Note 5

The distributed file system according to Supplementary Note 4, wherein in a process of merging the remaining incremental data other than the incremental data having been received last among the incremental data for plural time with the incremental data having been received last among the incremental data for plural times, the second controlling unit generates incremental data that includes a block included in only one of the incremental data for plural times and, in a case that a block is included in each of two or more incremental data, includes the block included in the last received incremental data of the two or more incremental data.

Supplementary Note 6

The distributed file system according to any of Supplementary Notes 1 to 5, wherein the incremental data generating unit acquires a snapshot that is an image of the first file system for every change and addition or at regular intervals, and calculates a difference between a currently acquired snapshot and a previously acquired snapshot as the incremental data.

Supplementary Note 7

A multiplexing method executed by a distributed file system which includes a first computer node having a first file system, a second computer node connected to the first computer node so as to be capable of communicating therewith and having a second file system as a replica of the first file system, and a third computer node connected to the second computer node so as to be capable of communicating therewith and having a third file system as a replica of the first file system, and in which the first computer node has an incremental data generating unit, a first storing unit and a first controlling unit, the second computer node has a second storing unit and a second controlling unit, and the third computer node has a third storing unit and a third controlling unit, the multiplexing method in the distributed file system, comprising:

generating a portion changed from a previous incremental data generation moment among data of the first file system as incremental data, by the incremental data generating unit of the first computer node;

storing the incremental data generated by the incremental data generating unit into the first storing unit and transmitting to the second computer node, by the first controlling unit of the first computer node;

storing the incremental data received from the first computer node into the second storing unit, reflecting on the second file system, and transmitting to the third computer node, by the second controlling unit of the second computer node;

storing the incremental data received from the second computer node into the third storing unit and reflecting on the third file system, by the third controlling unit of the third computer node; and in a case that the incremental data for plural times having received from the first computer node and having not transmitted to the third computer node yet are accumulated in the second storing unit, merging the remaining incremental data other than the incremental data having been received last among the incremental data for plural times with the incremental data having been received last among the incremental data for plural times, by the second controlling unit of the second computer node.

Supplementary Note 8

The multiplexing method in the distributed file system according to Supplementary Note 7, comprising deleting the remaining incremental data after the merging from the second storing unit, by the second controlling unit of the second computer node.

Supplementary Note 9

The multiplexing method in the distributed file system according to Supplementary Note 7 or 8, comprising:
transmitting a request for deleting the incremental data deleted from the second storing unit to the first controlling unit, by the second controlling unit; and
deleting the incremental data relating to the deletion request from the first storing unit, by the first controlling unit.

Supplementary Note 10

The multiplexing method in the distributed file system according to any of Supplementary Notes 7 to 9, wherein in the generation of the incremental data by the incremental data generating unit, a set of blocks changed from a previous incremental data generation moment among blocks configuring the first file system is generated as the incremental data.

Supplementary Note 11

The multiplexing method in the distributed file system according to Supplementary Note 10, wherein in the merging by the second controlling unit, incremental data that includes a block included in only one of the incremental data for plural times and, in a case that a block is included in each of two or more incremental data, includes the block included in the last received incremental data is generated.

Supplementary Note 12

The multiplexing method in the distributed file system according to any of Supplementary Notes 7 to 11, wherein in the generation of the incremental data by the incremental data generating unit, a snapshot that is an image of the first file system is acquired for every change and addition or at regular intervals and a difference between a currently acquired snapshot and a previously acquired snapshot is calculated as the incremental data.

Supplementary Note 13

A computer node connected to an upstream computer node and a downstream computer node so as to be capable of communicating therewith, and including a replication file system that is a replica of a master file system, a storing unit, and a controlling unit,
wherein the controlling unit receives incremental data including a portion changed from a previous incremental data generation moment among data of the master file system from the upstream computer node, stores into the storing unit, reflects on the replication file system, transmits to the downstream computer node and, in a case that the incremental data for plural times having received from the upstream computer node and having not transmitted to the downstream computer node yet are accumulated in the storing unit, merges the remaining incremental data other than the incremental data having been received last among the incremental data for plural times with the incremental data having been received last among the incremental data for plural times.

Supplementary Note 14

The computer node according to Supplementary Note 13, wherein the controlling unit deletes the remaining incremental data after the merging from the second storing unit.

Supplementary Note 15

The computer node according to Supplementary Note 13 or 14, wherein the controlling unit transmits a request for deleting the incremental data deleted from the storing unit to the upstream controlling unit.

Supplementary Note 16

The computer node according to any of Supplementary Notes 13 to 15, wherein in a process of merging the remaining incremental data other than the incremental data having been received last among the incremental data for plural times with the incremental data having been received last among the incremental data for plural times, the controlling unit generates incremental data that includes a block included in only one of the incremental data for plural times and, in a case that a block is included in each of two or more incremental data, includes the block included in the last received incremental data.

Supplementary Note 17

A program for causing a computer that is connected to an upstream computer node and a downstream computer node so as to be capable of communicating therewith and that includes a replication file system as a replica of a master file system and a storing unit, to function as a controlling unit configured to: receive incremental data including a portion changed from a previous incremental data generation moment among data of the master file system from the upstream computer node; store into the storing unit; reflect on the replication file system; transmit to the downstream computer node; and, in a case that the incremental data for plural times having received from the upstream computer node and having not transmitted to the downstream computer node yet are accumulated in the storing unit, merge the remaining incremental data other than the incremental data having been received last among the incremental data for plural times with the incremental data having been received last among the incremental data for plural times.

Supplementary Note 18

The program according to Supplementary Note 17, wherein the controlling unit deletes the remaining incremental data after the merging from the second storing unit.

Supplementary Note 19

The computer node according to Supplementary Note 17 or 18, wherein the controlling unit transmits a request for deleting the incremental data deleted from the storing unit to the upstream controlling unit.

Supplementary Note 20

The computer node according to any of Supplementary Notes 17 to 19, wherein in a process of merging the remaining incremental data other than the incremental data having been received last among the incremental data for plural times with the incremental data having been received last among the incremental data for plural times, the controlling unit generates incremental data that includes a block included in only one of the incremental data for plural times and, in a case that a block is included in each of two or more incremental data, includes the block included in the last received incremental data.

Supplementary Note 21

A computer-readable recording medium recording a program for causing a computer that is connected to an upstream computer node and a downstream computer node so as to be capable of communicating therewith and that includes a replication file system as a replica of a master file system and a storing unit, to function as a controlling unit configured to receive incremental data including a portion changed from a previous incremental data generation moment among data of the master file system from the upstream computer node; store into the storing unit; reflect on the replication file system; transmit to the downstream computer node; and, in a case that the incremental data for plural times having received from the upstream computer node and having not transmitted to the downstream computer node yet are accumulated in the storing unit, merge the remaining incremental data other than the incremental data having been received last among the incremental data for plural times with the incremental data having been received last among the incremental data for plural times.

Supplementary Note 22

The computer-readable recording medium according to Supplementary Note 21, wherein the controlling unit deletes the remaining incremental data after the merging from the second storing unit.

Supplementary Note 23

The computer-readable recording medium according to Supplementary Note 21 or 22, wherein the controlling unit transmits a request for deleting the incremental data deleted from the storing unit to the upstream controlling unit.

Supplementary Note 24

The computer-readable recording medium according to any of Supplementary Notes 21 to 23, wherein in a process of merging the remaining incremental data other than the incremental data having been received last among the incremental data for plural times with the incremental data having been received last among the incremental data for plural times, the controlling unit generates incremental data that includes a block included in only one of the incremental data for plural times and, in a case that a block is included in each of two or more incremental data, includes the block included in the last received incremental data.

The invention claimed is:

1. A computer system, comprising:
a first computer node comprising a first file system, wherein the file system is stored on a non-transitory computer readable recordable medium;
a second computer node connected to the first computer node so as to be capable of communicating therewith and comprising a second file system as a replica of the first file system; and
a third computer node connected to the second computer node so as to be capable of communicating therewith and comprising a third file system as a replica of the first file system,
wherein the first computer node includes an incremental data generating unit configured to generate a set of changed blocks from a previous incremental data generation moment among blocks of the first file system as incremental data, a first storing unit, and a first controlling unit configured to store the incremental data generated by the incremental data generating unit into the first storing unit and transmit to the second computer node,
wherein the incremental data generating unit acquires a snapshot that includes an image of the first file system for every change and addition or at regular intervals, and calculates a difference between a currently acquired snapshot and a previously acquired snapshot as the incremental data,
wherein the second computer node includes a second storing unit, and a second controlling unit configured to store the incremental data received from the first computer node into the second storing unit, reflect on the second file system, and transmit to the third computer node,
wherein the third computer node includes a third storing unit, and a third controlling unit configured to store the incremental data received from the second computer node into the third storing unit and reflect on the third file system, and
wherein, when plural incremental data received from the first computer node are accumulated in the second storing unit, before transmitting the plural incremental data to the third computer node, the second controlling unit merges plural sets of changed blocks of the plural incremental data into merged one incremental data, and then the second controlling unit transmits the merged one incremental data, rather than each piece of the plural incremental data received from the first computer node, to the third computer node.

2. The computer system according to claim 1, wherein the second controlling unit deletes a remaining incremental data after the merging from the second storing unit.

3. The computer system according to claim 2, wherein the second controlling unit transmits a request for deleting the incremental data deleted from the second storing unit to the first controlling unit, and
wherein the first controlling unit deletes the incremental data relating to the deletion request from the first storing unit.

4. The computer system according to claim 1, wherein the incremental data generating unit generates the set of changed blocks from the previous incremental data generation moment among blocks configuring the first file system, as the incremental data.

5. The computer system according to claim 4, wherein in a process of the merging, the second controlling unit generates the incremental data that includes a block included in only one of the plural incremental data and, in a case that a block is included in each of two or more incremental data, includes the block included in the last received incremental data of the two or more incremental data.

6. The computer system according to claim 1, wherein the second controlling unit merges the plural sets of changed blocks of the plural incremental data by merging a last received incremental data among the plural incremental data with a remaining of the plural incremental data, and deleting the remaining of the plural incremental data from the second storing unit.

7. The computer system according to claim 1, wherein the second controlling unit merges changed blocks between a changed source file at a certain time and a corresponding destination file into changed blocks between the changed source file at a later time and the corresponding destination file.

8. A multiplexing method executed by a distributed file system which includes a first computer node comprising a first file system, a second computer node connected to the first computer node so as to be capable of communicating therewith and comprising a second file system as a replica of the first file system, and a third computer node connected to the second computer node so as to be capable of communicating therewith and comprising a third file system as a replica of the first file system, and in which the first computer node includes an incremental data generating unit, a first storing unit and a first controlling unit, the second computer node includes a second storing unit and a second controlling unit, and the third computer node includes a third storing unit and a third controlling unit, the multiplexing method in the distributed file system, comprising:
generating a set of changed blocks from a previous incremental data generation moment among blocks of the first file system as incremental data, by the incremental data generating unit of the first computer node;
storing the incremental data generated by the incremental data generating unit into the first storing unit and transmitting to the second computer node, by the first controlling unit of the first computer node;
wherein, in the generation of the incremental data by the incremental data generating unit, a snapshot that includes an image of the first file system is acquired for every change and addition or at regular intervals and a difference between a currently acquired snapshot and a previously acquired snapshot is calculated as the incremental data,
storing the incremental data received from the first computer node into the second storing unit, reflecting on the second file system, and transmitting to the third computer node, by the second controlling unit of the second computer node;
storing the incremental data received from the second computer node into the third storing unit and reflecting on the third file system, by the third controlling unit of the third computer node; and
when plural incremental data received from the first computer node are accumulated in the second storing unit, before transmitting the plural incremental data to the third computer node, merging plural sets of changed blocks of the plural incremental data into merged one incremental data, and then the second controlling unit transmits the merged one incremental data, rather than each piece of the plural incremental data received from the first computer node, to the third computer node.

9. The multiplexing method in the distributed file system according to claim 8, further comprising deleting a remaining incremental data after the merging from the second storing unit, by the second controlling unit of the second computer node.

10. The multiplexing method in the distributed file system according to claim 9, further comprising:
transmitting a request for deleting the incremental data deleted from the second storing unit to the first controlling unit, by the second controlling unit; and
deleting the incremental data relating to the deletion request from the first storing unit, by the first controlling unit.

11. The multiplexing method in the distributed file system according to claim 8, wherein in the generation of the incremental data by the incremental data generating unit, a set of blocks changed from a previous incremental data generation moment among blocks configuring the first file system is generated as the incremental data.

12. The multiplexing method in the distributed file system according to claim 11, wherein, in the merging by the second controlling unit, the incremental data that includes a block included in only one of the plural incremental data and, in a case that a block is included in each of two or more incremental data, includes the block included in the last received incremental data is generated.

13. The multiplexing method in the distributed file system according to claim 8, wherein the second controlling unit merges changed blocks between a changed source file at a certain time and a corresponding destination file into changed blocks between the changed source file at a later time and the corresponding destination file.

14. A computer node connected to an upstream computer node and a downstream computer node so as to be capable of communicating therewith, and including a replication file system that is a replica of a master file system, a storing unit, and a controlling unit, stored on a non-transitory computer readable recordable medium,
wherein the controlling unit receives incremental data including a set of changed blocks from a previous incremental data generation moment among blocks of the master file system from the upstream computer node, stores into the storing unit, reflects on the replication file system, transmits to the downstream computer node and, when plural incremental data received from the upstream computer node are accumulated in the storing unit, before transmitting the plural incremental data to the downstream computer node, the controlling unit merges plural sets of changed blocks of the plural incremental data into merged one incremental data and then the controlling unit transmits the merged one incremental data, rather than each piece of the plural incremental data received from the upstream computer node, to the downstream computer node,
wherein a snapshot is created that includes an image of the upstream file system for every change and addition or at regular intervals, and calculates a difference between a currently acquired snapshot and a previously acquired snapshot as the incremental data.

15. The computer node according to claim 14, wherein the controlling unit deletes a remaining incremental data after the merging from the second storing unit.

16. The computer node according to claim 15, wherein the controlling unit transmits a request for deleting the incremental data deleted from the storing unit to the upstream controlling unit.

17. The computer node according to claim 16, wherein, in a process of merging a remaining incremental data other than the incremental data having been received last among the incremental data for plural times with the incremental data having been received last among the incremental data for plural times, the controlling unit generates incremental data that includes a block included in only one of the incremental data for plural times and, in a case that a block is included in each of two or more incremental data, includes the block included in the last received incremental data.

18. The computer node according to claim 14, wherein the controlling unit merges changed blocks between a changed source file at a certain time and a corresponding destination file into changed blocks between the changed source file at a later time and the corresponding destination file.

* * * * *